US011781356B2

United States Patent
Molinari

(10) Patent No.: US 11,781,356 B2
(45) Date of Patent: *Oct. 10, 2023

(54) DEVICE FOR OPENING AN AIRCRAFT DOOR IN EMERGENCIES, SAID DEVICE HAVING A LEVER-TYPE RETENTION MEMBER

(71) Applicant: LATECOERE, Toulouse Occitaine (FR)

(72) Inventor: Didier Molinari, Balma Occitanie (FR)

(73) Assignee: LATECOERE, Toulouse Occitanie (FR)

( * ) Notice: Subject to any disclaimer, the term of this patent is extended or adjusted under 35 U.S.C. 154(b) by 294 days.

This patent is subject to a terminal disclaimer.

(21) Appl. No.: 17/262,128

(22) PCT Filed: Jul. 23, 2019

(86) PCT No.: PCT/EP2019/069751
§ 371 (c)(1),
(2) Date: Jan. 21, 2021

(87) PCT Pub. No.: WO2020/020861
PCT Pub. Date: Jan. 30, 2020

(65) Prior Publication Data
US 2021/0348430 A1 Nov. 11, 2021

(30) Foreign Application Priority Data
Jul. 24, 2018 (FR) ........................................ 1856874

(51) Int. Cl.
*E05F 1/00* (2006.01)
*E05F 1/10* (2006.01)
*B64C 1/14* (2006.01)

(52) U.S. Cl.
CPC ............ *E05F 1/105* (2013.01); *B64C 1/1423* (2013.01); *E05Y 2201/474* (2013.01);
(Continued)

(58) Field of Classification Search
CPC ..... E05F 1/105; E05F 1/00; E05F 1/08; E05F 1/10; E05F 1/1008; E05Y 2800/252;
(Continued)

(56) References Cited

U.S. PATENT DOCUMENTS 5,031,863 A * 7/1991 Noble .................... B64C 1/1407
D12/345
5,064,147 A * 11/1991 Noble .................... B64C 1/1407
292/DIG. 31
(Continued)

FOREIGN PATENT DOCUMENTS

DE 202016003562 9/2017
EP 0741073 11/1996
(Continued)

*Primary Examiner* — Chi Q Nguyen
(74) *Attorney, Agent, or Firm* — Defillo & Associates, Inc.; Evelyn A. Defillo

(57) ABSTRACT

Device for opening an aircraft door in emergencies, said door being provided with an opening mechanism, including a device (2, 5) for actuating the opening mechanism, having: a tubular maneuvering member (2), and a second locking end (4) which has a stop surface (43); resilient compression device (5); a member for holding the second locking end (4), the holding member including a rotary lock (9) and a lever (44) which is suitable for cooperating with the stop surface (43), the rotary lock (9) being rotatable about the displacement axis of the maneuvering member (2); device (31) for activating the actuation device (2, 5) which are suitable for driving the rotary lock (9).

18 Claims, 5 Drawing Sheets

(52) U.S. Cl.
CPC ... *E05Y 2201/686* (2013.01); *E05Y 2800/252* (2013.01); *E05Y 2900/502* (2013.01)

(58) Field of Classification Search
CPC .......... E05Y 2201/686; E05Y 2201/22; E05Y 2900/502; E05Y 2201/474; E05Y 2201/68; B64C 1/1423
See application file for complete search history.

(56) References Cited

U.S. PATENT DOCUMENTS

| | | | |
|---|---|---|---|
| 5,289,615 A | 3/1994 | Banks | |
| 8,307,496 B2 * | 11/2012 | Wu | E05F 3/108 16/72 |
| 8,443,488 B2 * | 5/2013 | Zhang | E05F 3/221 16/65 |
| 9,702,176 B2 * | 7/2017 | Janak | E05F 1/105 |
| 10,472,041 B2 * | 11/2019 | Hacault | B64C 1/1407 |
| 2002/0184733 A1 | 12/2002 | Lin | |
| 2009/0020382 A1 * | 1/2009 | Van Weelden | F16F 9/465 188/282.3 |
| 2016/0002965 A1 | 1/2016 | Janak | |
| 2017/0314583 A1 * | 11/2017 | Koscielniak | F15B 15/227 |
| 2018/0148156 A1 * | 5/2018 | Hacault | B64C 1/1407 |
| 2020/0270926 A1 * | 8/2020 | Tendyra | E05F 5/00 |
| 2021/0070416 A1 * | 3/2021 | Buchet | E05C 9/08 |
| 2021/0229792 A1 * | 7/2021 | Blum | E05B 15/0086 |
| 2022/0081941 A1 * | 3/2022 | Samuelson | B64C 1/1407 |

FOREIGN PATENT DOCUMENTS

| | | |
|---|---|---|
| EP | 2644495 | 10/2013 |
| FR | 2830564 | 4/2003 |
| FR | 2864021 | 6/2005 |
| FR | 2975967 | 12/2012 |

* cited by examiner

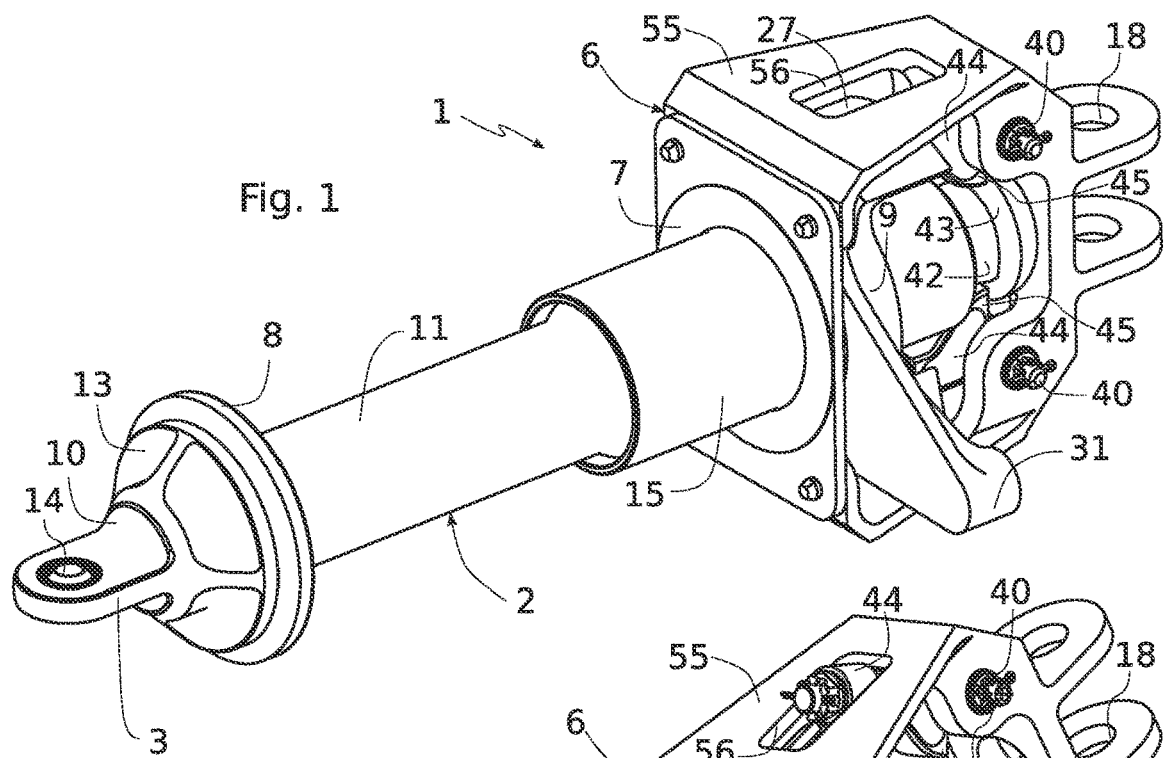
Fig. 1
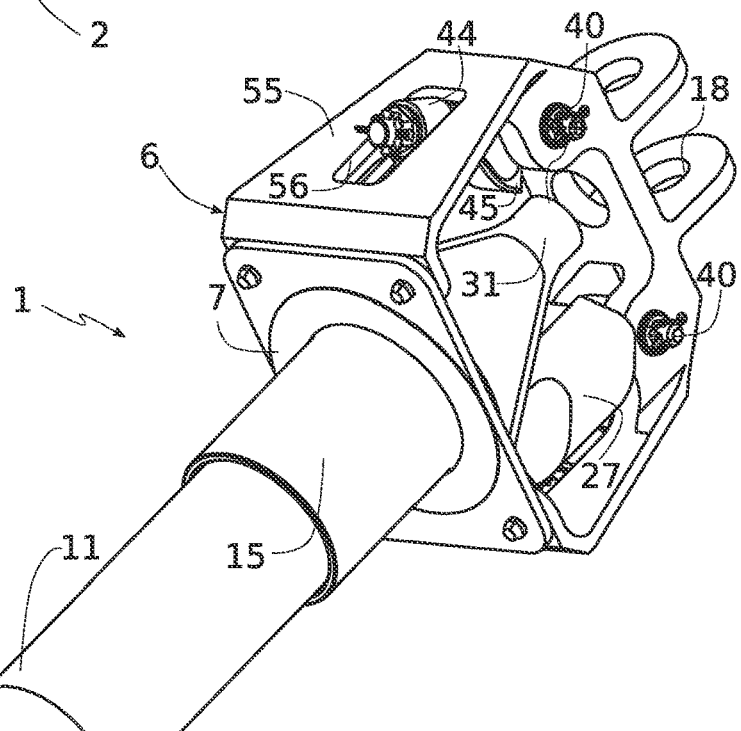
Fig. 2
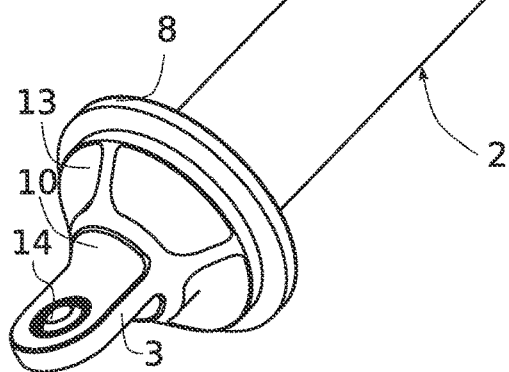

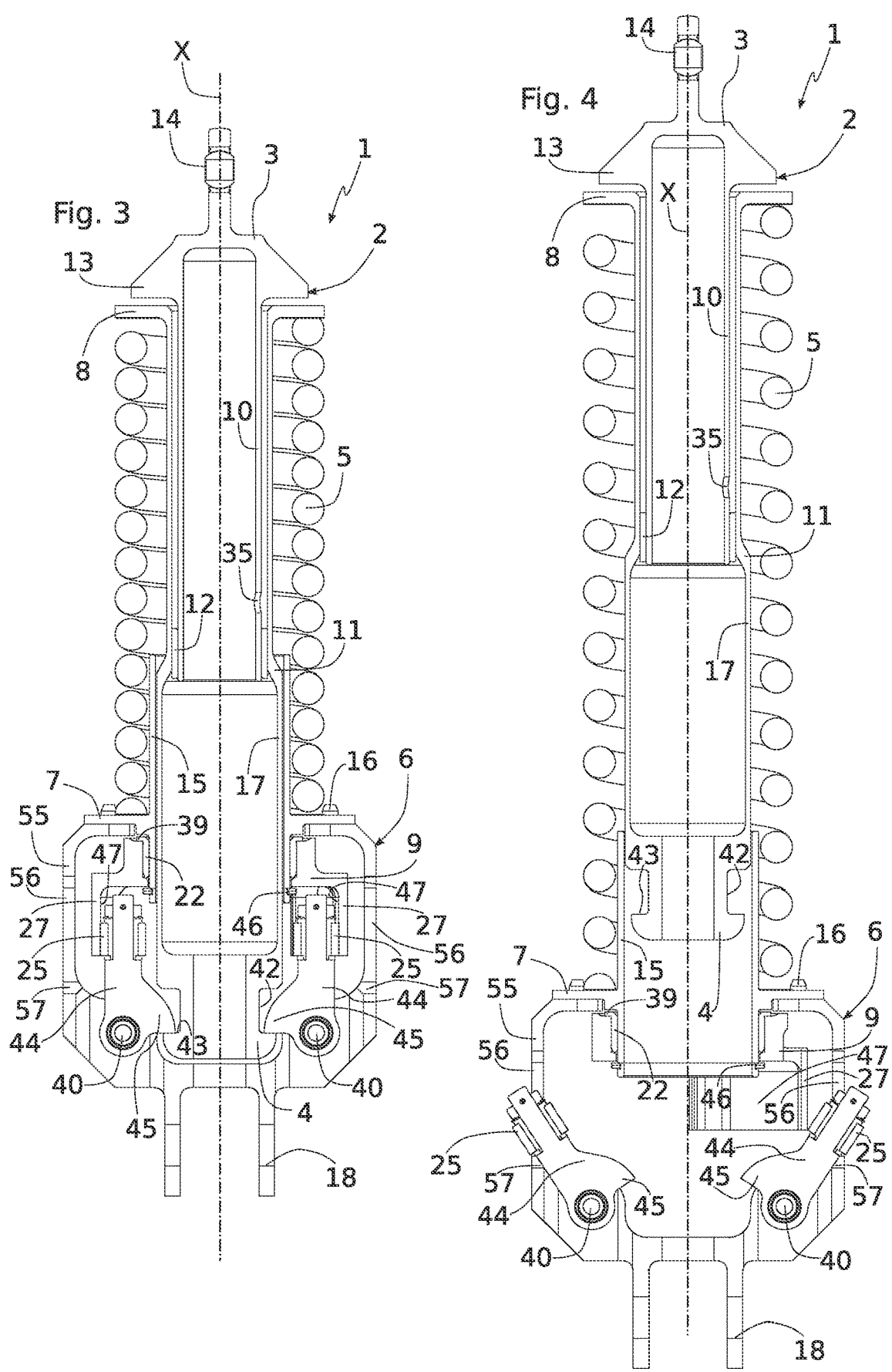

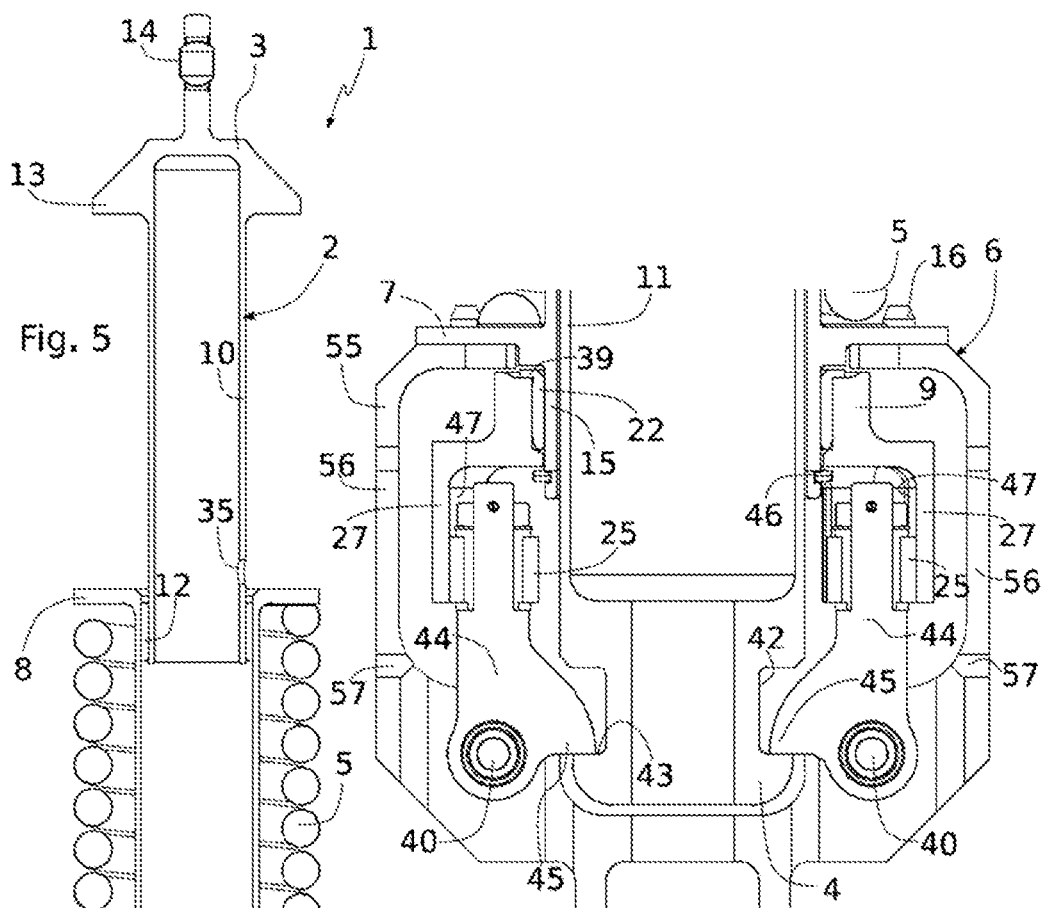
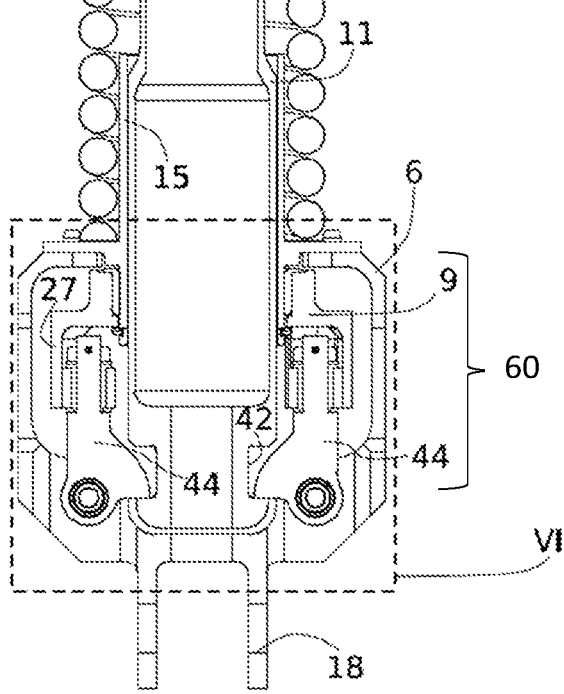
Fig. 5
Fig. 6

DEVICE FOR OPENING AN AIRCRAFT DOOR IN EMERGENCIES, SAID DEVICE HAVING A LEVER-TYPE RETENTION MEMBER

CROSS REFERENCE TO RELATED APPLICATION

This application is a national stage entry of PCT/EP2019/069751 filed Jul. 23, 2019, under the International Convention claiming priority over French Patent Application No. 1856874 filed Jul. 24, 2018.

TECHNICAL FIELD

The invention relates to the field of aeronautics and concerns an emergency opening device for an aircraft door fitted with an opening mechanism.

Aircraft doors comprising an opening mechanism can be opened in order to allow passengers to exit and to enter, or to allow evacuation in an emergency situation. In the event of an emergency evacuation of the passengers, the aircraft doors, whether these be passenger doors or emergency evacuation doors, usually comprise an emergency opening device which, if activated, brings about rapid and effortless opening of the doors, without the need for human intervention.

Such emergency opening devices conventionally comprise means for actuating the door-opening mechanism, which means can switch between a passive state and an active state of activating the opening mechanism (which brings about the opening of the door), and means for activating the actuating members (which allow a user to initiate the emergency opening).

PRIOR ART

At the present time, as notably described in patent applications FR2830564 and EP0741073, the actuating means conventionally consist of an actuator of pneumatic type powered by means of an ancillary reserve of driving fluid. Such actuating means do, however, have a number of disadvantages. Specifically, and in the first place, they are relatively weighty and relatively bulky, notably because of the presence of the ancillary reserve of driving fluid. In addition, they require periodic checks on the pressure of the driving fluid, and require the ancillary reserve to be replaced periodically even if it has not been used. Finally, following activation of the emergency opening device, these actuating means, in order to be returned to an operational status, require the ancillary reserve of driving fluid to be replaced.

Another current solution notably described in patent application FR2864021 allows the bulkiness and weight of the actuating means to be reduced. Specifically, with this solution, the actuating means consist of a pyrotechnic ram, that is to say an autonomous ram that does not need to be supplied from a source of driving fluid. On the other hand, such pyrotechnic rams have to be periodically inspected and replaced even if not used. These pyrotechnic rams also have to be replaced after the emergency opening device has been activated.

Patent application FR2975967 describes an aircraft emergency opening device which overcomes the abovementioned disadvantages. That emergency opening device consists of actuating means of mechanical design making it possible to dispense with pneumatic or pyrotechnic elements. The weight and bulkiness of the emergency opening device are thus reduced, the reliability is increased, and this device requires little or no maintenance. However, the emergency opening device described requires activation means comprising an electromagnet. This emergency opening device is therefore not entirely mechanical because it has recourse to an electromechanical element which requires an external source of electrical energy and to a control device designed to connect the electromagnet to this external source of electrical energy. This door opening device therefore requires, in addition to this external source of electrical energy, energy-supply and control wiring which may be an additional source of complexity and malfunctioning. The reason why an electromagnet is needed in this emergency opening device is that the retainer applies a significant force to an operating member, such that the transition of the retainer into the open position in order to release the operating member for emergency opening requires this force to be overcome. The emergency opening device comprises a reset portion and jaws that allow a very significant retaining force to be obtained, which means that elastic means of appreciable rating can be employed. In this configuration, creating a retainer that is purely mechanical and can be activated by an individual would entail a lever arm of excessive length incompatible with the objectives of compactness of the emergency opening device.

SUMMARY OF THE INVENTION

The object of the invention is to improve the emergency opening devices of the prior art by providing such a device the operation and control of which are purely mechanical, and in which the transition of the retainer from its closed position in which it blocks the operating member to its open position in which it releases this operating member for the purposes of emergency opening requires only very little effort on the part of the user triggering the emergency opening device.

To this end, the invention concerns an emergency opening device for an aircraft door fitted with an opening mechanism, comprising:

actuating means for actuating the opening mechanism, which can switch between a passive state and an active state of activating the opening mechanism, and which comprise: a tubular operating member provided with a first end for connecting to the door, and with a locking second end; elastic compression means arranged between a fixed end-stop element and the operating member; a retainer for restraining the locking second end, able to move between a closed position of locking of the locking second end, in a position of the operating member corresponding to the passive state of the actuating means in which position the elastic means are kept compressed, and an open position of releasing of the locking second end allowing the operating member to move along an axis of movement toward a position corresponding to the active state of the actuating means, under the effect of the force resulting from the expansion of the elastic means;

means for activating the actuating means designed to bring about the opening of the retainer;

In this device:

the tubular operating member has a stop surface on its locking second end;

the retainer comprises: a lever equipped with a locking tooth and mounted with the ability to pivot on the fixed end-stop element, the lever being able to move between a closed position in which the locking tooth collaborates with the stop surface to lock the locking second end, and an open position in which the locking tooth is distant from the stop surface; and a rotary latch having a retaining surface defined by a portion of a cylinder centered on the axis of movement, the rotary latch being able to rotate about the axis of movement between a closed position in which the retaining surface holds the lever in its closed position, and an open position in which the retaining surface is away from the lever.

In the present description and the claims, the expression "connected to the door" means relative to the aircraft door in the broadest sense. The aircraft door in the broadest sense includes the opening panel of the door, the door-opening mechanism, or else the structure framing the door and connected to the fuselage (corresponding to the doorpost). Thus, the first end of the actuating member is connected to one element of the door (opening panel, opening mechanism, or framing structure) and the fixed end-stop element is connected to another element of the door (opening panel, opening mechanism, or framing structure) which elements are such that expansion of the elastic means causes actuation of the door-opening mechanism and actual opening of the door. For example, the first end of the actuating member may be fixed to the door-opening mechanism, and the fixed end-stop element may be fixed to the opening panel of the door. In another example, the first end of the actuating member may be fixed to the opening panel of the door, and the fixed end-stop element may be fixed to the structure framing the door.

Such an emergency opening device offers all the advantages of a mechanical device as described in document FR2975967. These actuating means have lower weight and bulkiness. The mechanical design of the actuating means requires no special maintenance while the opening device is not used. The use of the opening device does not require the replacement of a triggering member, as is required with pneumatic or pyrotechnic devices. No driving fluid is required for activating the actuating means.

The device according to the invention is also fully mechanical and requires no connection to an external source of energy or to a remote-operation device. Such a device forms an end-product of the fully autonomous mechanical ram type, which is a hallmark of operational reliability and safety, both of which are highly sought after in the field of aeronautics and more especially of emergency opening devices.

Device according to the invention is fully mechanical and autonomous, it may comprise highly rated elastic means, namely means intended to apply a significant opening force to the door opening mechanism, something which is needed in this emergency door-opening application. Despite the high rating of the elastic elements, the actuating means can be activated effortlessly because of the lever-type retainer.

The emergency opening device according to the invention may include the following additional features, either individually or in combination:
the stop surface is defined by a groove made in the locking second end of the operating member;
the means for activating the actuating means comprise a control lever designed to force the rotary latch to rotate;
the rotary latch is mounted with the ability to rotate with respect to the fixed end-stop element;
the device comprises an axis cylinder fixed to the fixed end-stop element, the operating member being mounted with the ability to slide in the axis cylinder along the axis of movement;
the fixed end-stop element comprises: a body equipped with fixing means and on which the lever is pivot-mounted; a flange attached to the axis cylinder, the elastic means bearing against the flange;
the operating member is mounted as a sliding fit in the axis cylinder;
the stop surface is substantially orthogonal to the axis of movement;
the rotary latch comprises a blade extending axially, the retaining surface being defined by the blade;
the rotary latch comprises two blades extending axially facing one another, a retaining surface being defined by each blade, and the retainer comprises two levers each equipped with a locking tooth and each pivot-mounted on the fixed end-stop element, each lever being able to move between a closed position in which the locking tooth collaborates with the stop surface to lock the locking second end, and an open position in which the locking tooth is away from the stop surface, the rotary latch being able to rotate about the axis of movement between a closed position in which each retaining surface holds one of the levers in its closed position, and an open position in which each retaining surface is away from the corresponding lever;
the blade comprises an end stop for the lever;
the rotary latch surrounds the axis cylinder and is mounted with the ability to rotate on the axis cylinder;
the rotary latch is axially fixed to the axis cylinder being held between two axial end stops;
the lever comprises a rolling ring designed to roll over the retaining surface;
the fixed end-stop element comprises a window that allows the lever to pass when the lever is in the open position;
the window defines an end stop for the lever;
the retainer comprises a toggle-joint device operating the lever between its open and closed positions, and the rotary latch comprises a cam mounted with the ability to rotate on the fixed end-stop element and collaborating with the toggle-joint device so that rotation of the rotary latch opens the toggle-joint device;
the elastic compression means comprise a tubular spring at least partially surrounding the operating member and the ends of which are placed between the fixed end-stop element and the operating member.

BRIEF DESCRIPTION OF THE FIGURES

Further features and advantages of the invention will become apparent upon reading the following non-limiting description, with reference to the appended figures, in which:

FIG. 1 is a perspective view of an emergency opening device according to the invention, in its passive state;

FIG. 2 depicts the device of FIG. 1 in its active state;

FIG. 3 is a view in longitudinal section of the device in its position of FIG. 1;

FIG. 4 is a view in longitudinal section of the device in its position of FIG. 2;

FIG. 5 is similar to FIG. 3, with the operating member in the service-opening position:

FIG. 6 is an enlarged view of the rectangle VI of FIG. 5;

DETAILED DESCRIPTION OF THE INVENTION

Figure 7:
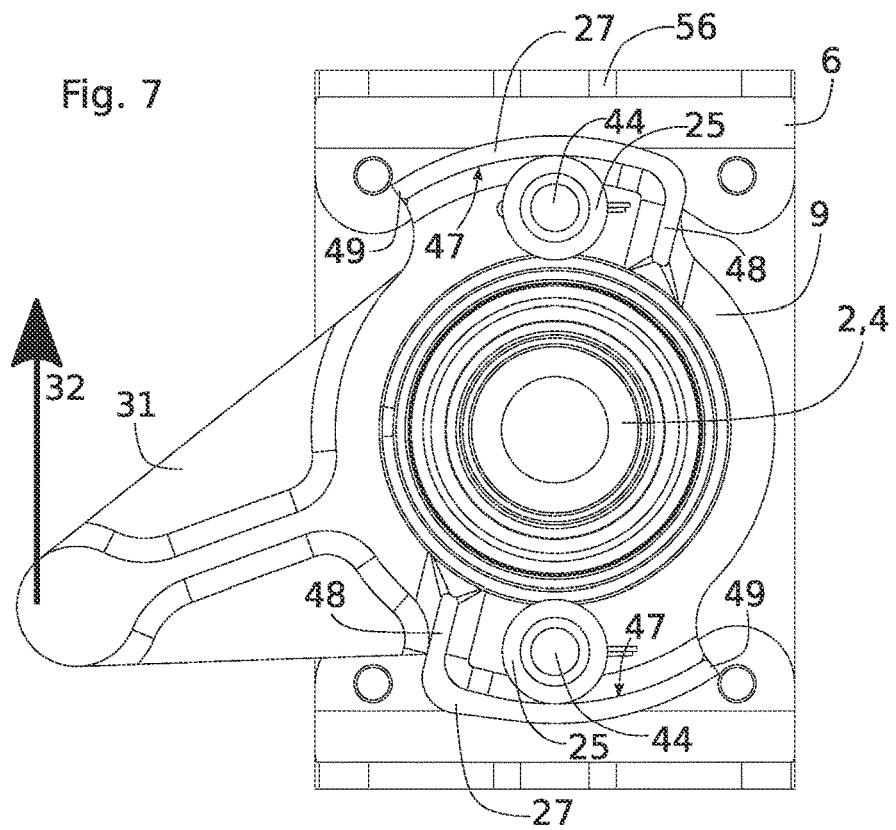
FIG. 7 is a face-on view of the retainer of the device in its position of FIG. 1.

The aircraft door emergency opening device 1 according to the invention is depicted in perspective in FIGS. 1 and 2, in its passive state and in its active state, respectively. This device 1 is intended to be connected by its ends to elements of the aircraft door in such a way that expansion of this device 1 (in the active state, FIG. 2) brings about the emergency opening of the door.

This emergency opening device 1 can be positioned on any type of aircraft door or opening panel that has an opening mechanism. Aircraft door opening mechanisms are well known and not described in further detail here. The device 1 may for example be mounted in such a way as to collaborate with a door opening mechanism having a chain transmission, as described in document FR2975967, or else in other known opening mechanisms such as mechanisms involving link rods forming a deformable parallelogram.

Whatever the type of aircraft door opening mechanism, the emergency opening device 1, when activated by a user, allows rapid and automatic opening of the aircraft door so that this aircraft can be evacuated.

With reference to FIGS. 3 and 4, the device 1 comprises means for actuating the door opening mechanism, which means can switch between the passive state of FIG. 1 and the active state of FIG. 2. In the passive state, the device 1 applies no load to the door or the door opening mechanism, and the emergency opening function is not activated; this corresponds to the normal state of operation of the door opening mechanism. In the active state, in the event of an emergency and when the aircraft needs to be evacuated, the door opening mechanism is activated by force exerted by the device 1 until the door is fully open (device 1 in the position of FIGS. 2 and 4).

With reference to FIGS. 3 and 4, these means for actuating the door opening mechanism comprise a tubular operating member 2 which is able to move along an axis of movement X which is the longitudinal axis thereof. This operating member 2 comprises a first end 3 for connecting to a door element which has not been depicted (for example the opening mechanism) and comprises a second end 4 referred to as the locking end.

The first end 3 comprises a ball-joint ball 14 allowing the device 1 to be coupled to an element of the door.

Throughout the description and the claims, the references "axial" and "radial" are with reference to the axis X.

The actuating means also comprise elastic compression means which here consist of a cylindrical spring 5 which is placed between a fixed end-stop element 6 and the operating member 2. In FIGS. 1 and 2, the spring 5 has not been depicted in order to simplify the figure. The fixed end-stop element 6 comprises a flange 7 against which one end of the spring 5 can abut, and the operating member 2 also comprises a flange 8 against which the other end of the spring 5 can abut. When the actuating means are in the passive state, the spring 5 is compressed and the two flanges 7, 8 are as close-together as they can be, whereas in its active state, the two flanges 7, 8 are moved away from one another under the effect of the force of the spring 5. The fixed-end stop element 6 comprises two fixing holes 18 for fixing it to an element of the aircraft door in such a way that expansion of the spring 5 will bring about the opening of this door.

The actuating means of the device 1 additionally comprise a retainer 60 for restraining the locking second end 4 of the operating member 2, this retainer 60 here consisting of a rotary latch 9 and of two locking levers 44. The rotary latch 9 is mounted with the ability to rotate about the axis X, and the levers 44 mounted with the ability to pivot on the fixed end-stop element 6, each pivoting about a pivot axle 40. The retainer 60 is able to move between a closed position, in which the rotary latch 9 hold the levers 44 in a locking position (FIG. 3), and an open position, in which the rotary latch 9 releases the levers 44 (FIG. 4).

The fixed end-stop element 6 comprises two windows 56 that allow the levers 44 to pass when they are in the open position (FIG. 4). These windows 56 also each define an end stop 57 against which the corresponding lever 44 comes into abutment when it is in this open position.

The operating member 2 is a telescopic element made up of a first-end tube 10 and of a second-end tube 11 able to slide one inside the other. In the present example, the first-end tube 10 has an outside diameter smaller than the inside diameter of the second-end tube 11 so that the first-end tube 10 can be inserted inside the second-end tube 11 over a nesting portion. A sliding bearing 12, made from a material having a low coefficient of friction, is also mounted between the first-end tube 10 and the second-end tube 11 so that the sliding of the first-end tube 10 with respect to the second-end tube 11 causes the sliding bearing 12 to slide against the internal walls of the second-end tube 11. A hole 35 made in the first-end tube 10 allows any condensate that might form inside the device 1 to be discharged. The telescopic nature of the operating member 2 allows for a function referred to as the service-opening function described later on. FIG. 5 depicts the device 1 with the operating member 2 in the service-opening position.

The first-end tube 10 thus constitutes the first end 3 of the operating member 2. The first-end tube 10 is additionally provided with a flange 13 collaborating with the flange 8 which, for its part, is made on the second-end tube 11. The two flanges 8, 13 collaborate in such a way that, when the spring 5 pushes on the operating member 2 (active state of the actuating means, see FIG. 4), the spring 5 bears against the flange 8 which itself bears against the flange 13 and therefore pushes back on the whole operating member 2, moving it away from the fixed end-stop element 6. The first-end tube 10 is therefore nested to its maximum extent inside the second-end tube 11, with the flanges 8, 13 butting against one another.

The whole of the operating member 2 (which is therefore made up of the first-end tube 10 and of the second-end tube 11) can move longitudinally, along the axis X, between the two extreme positions of FIGS. 3 and 4, when emergency-opening is triggered. This movement of the operating member 2 is achieved by sliding of the operating member 2 inside an axis cylinder 15. The axis cylinder 15 is a cylinder fixed to the fixed end-stop element 6 by screw-fastening means 16. In this example, the flange 7 via which the spring 5 bears against the fixed end-stop element 6 is formed by an annular ring projecting from the axis cylinder 15. The flange 7 may collaborate with an optional washer positioned between the spring 5 and flange 7. The fixed end-stop element 6 thus comprises: a body 55 equipped with fixing means 18 and on which the lever 44 is pivot-mounted; the flange 7 attached to the axis cylinder 15, the spring 5 bearing against the flange 7 or against the optional washer.

The axis cylinder 15 provides a sliding pivot connection for guiding the operating member 2 longitudinally, along the axis X, by virtue of a sliding portion 17 provided on the second-end tube 11, the outside diameter of the sliding portion 17 being tailored to fit the inside diameter of the axis cylinder 15.

The operating member 2 performs its service-opening function, in addition to the emergency opening function, thanks to its telescopic nature, allowing the aircraft door to be opened and closed under normal conditions of use, namely outside of emergency-opening periods, the emergency opening device being kept in a passive state, and the spring 5 remaining compressed. For this function, relative sliding between the first-end tube 10 and the second-end tube 11 along the axis X is possible thanks to the sliding bearing 12 described hereinabove.

When the device 1 is in the position of FIG. 3, the aircraft door is closed. Starting from this position, there are two ways in which the door can open:

an emergency opening mode in which the actuating means activated. Expansion of the spring 5 will then cause the fixed end-stop element 6 and the second-end tube 11 to move apart (because of the flanges 7, 8). The flange 8 will additionally itself drive the flange 13, and therefore the first-end tube 10, along the axis X. The whole operating member 2 therefore arrives in the position of FIGS. 2 and 4, the door being opened as a result of the thrusting action of the spring 5;

a service-opening mode in which the first-end tube 10 slides freely inside the second-end tube 11, under the effect of the door being opened by an external action, as far as the position of FIG. 5 which corresponds to the full opening of the aircraft door.

In order to allow the operating member 2 to be locked in its position of FIGS. 1 and 3, the second end 4 of the operating member 2 is equipped with a keeper which in this instance consists of a groove 42 made in the second-end tube 11. The groove 42 has a stop surface 43 substantially orthogonal to the axis X.

FIG. 6 is an enlarged view of the rectangle VI of FIG. 5. In this locked position, the rotary latch 9 is in the closed position and therefore restrains the levers 44 in a locked position. In this locked position, the levers 44 collaborate with the groove 42 to restrain the second end 4 of the operating member 2. The levers 44 each comprise a locking tooth 45 engaged against the stop surface 43 of the groove 42 so that as long as the levers 44 are kept in this locked position by the rotary latch 9, the operating member 2 is restrained by the levers 44.

The collaboration between the rotary latch 9 and the levers 44 will now be described with reference to FIGS. 6 and 7. The rotary latch 9 has an annular overall shape allowing it to be mounted with the ability to turn on the axis cylinder 15, so that the rotary latch 9 can be rotated with respect to the axis cylinder 15 in a rotation about the axis X. In this example, the rotary latch 9 is mounted on a sliding ring 22 having a low coefficient of friction. The rotary latch 9 is solidly attached to an activation means consisting of a control lever 31 allowing the latch 9 to be forced to rotate.

The rotary latch 9 is immobilized axially on the axis cylinder 15 by two sliding axial end-stops consisting of an axial stop flange 39 of the sliding ring 22 and of an elastic ring 46 mounted on the axis cylinder 15. The rotary latch 9 is thus in a non-sliding pivot connection on the axis cylinder 15. The sliding ring 22 allows the rotary latch 9 to rotate with respect to the axis cylinder 15 with very low friction force.

The rotary latch 9 comprises two blades 27 extending axially toward the levers 44. Each blade 27 forms a retaining surface 47 which is a portion of the cylinder which is centered on the axis X. In addition to the retaining surface 47, each blade 27 comprises an end stop 48 for abutment in the locked position. On the retaining surface 47, at the opposite end to the end stop 48, each blade 27 comprises a free edge 49 allowing release of the corresponding lever 44, as set out hereinafter.

The levers 44 additionally each comprise a rolling ring 25, mounted with the ability to rotate on the corresponding lever 44. Each rolling ring 25 is retained on the corresponding lever 44 by an end stop at the end of the lever, consisting in this example of a nut 50 secured by a pin 51. The rolling rings 25 are preferably made from a material with a low coefficient of friction in order to minimize the forces as the rolling ring 25 rotates with respect to the corresponding lever 44.

When the retainer 60 is in the closed position, the rotary latch 9 is in the locked position (see FIGS. 6 and 7) and the levers 44 are held in a locked position by the retaining surface 47 of the corresponding blade 27. In the locked position of the levers 44, the locking teeth 45 restrain the operating member 2 via its second end 4, by virtue of the stop surface 43 of the groove 42.

Figure 8:
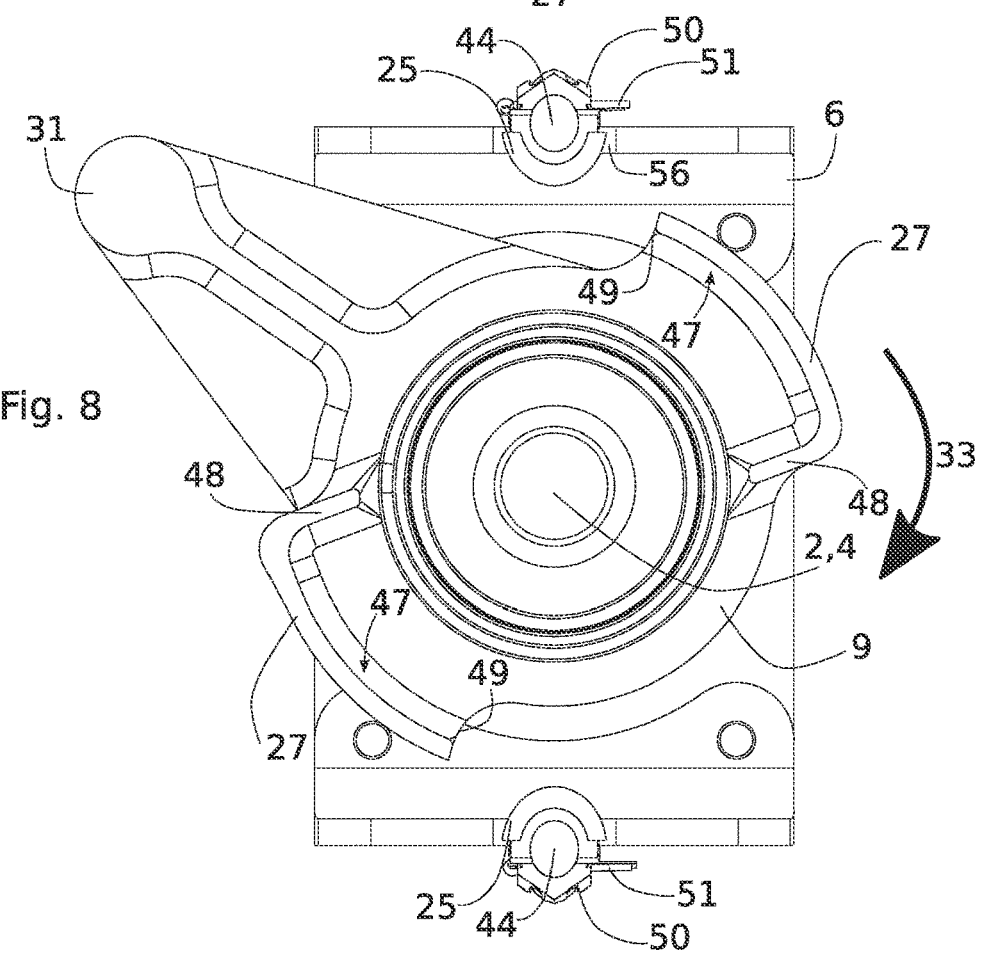
FIG. 8 is a face-on view of the retainer of the device in its position of FIG. 2.

When the emergency opening device 1 needs to be triggered, in the event of an emergency and with a view to evacuating the aircraft, a user actuates the control lever 31 by applying a force in the direction of the arrow 32 of FIG. 7, which causes the rotary latch 9 to rotate in the direction of the arrow 33. The rolling rings 25 of the levers 44 will each roll over the retaining surface 47, under very little effort, toward the free edges 49. When the rolling rings 25 pass beyond the free edges 49, the levers 44 are no longer restrained by the rotary latch 9 (see FIG. 8). When the levers 44 are no longer restrained by the rotary latch 9, the spring 5 (which is constantly urging the stop surface 43 of the groove 42 against the locking teeth 45) causes the levers 44 to rotate about their axle 40 so that the locking teeth 45 move out of the groove 42 and the second end 4 of the operating member 2 is therefore no longer restrained. The spring 5 then causes the operating member 2 to move along the axis X as far as the position of FIG. 4, and therefore causes emergency opening of the door.

Optionally, the control lever 31 may also be secured against undesired triggering by a pin, such as a quick-release pin with spring-loaded ball.

Figure 9:
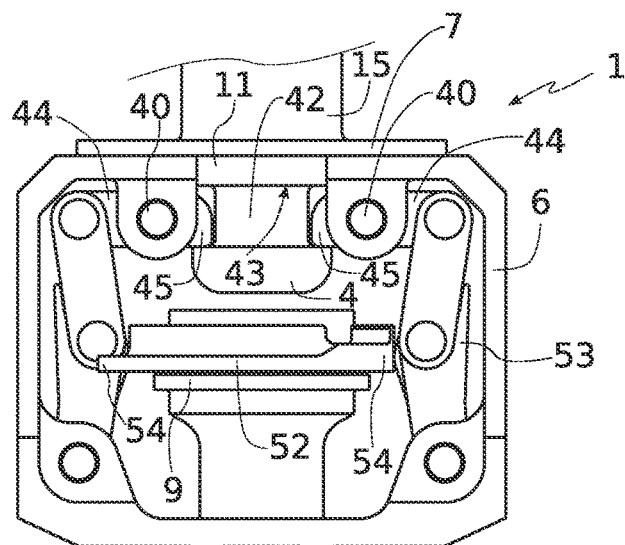
FIGS. 9 to 11 illustrate a second embodiment of the emergency opening device.
Figure 10:
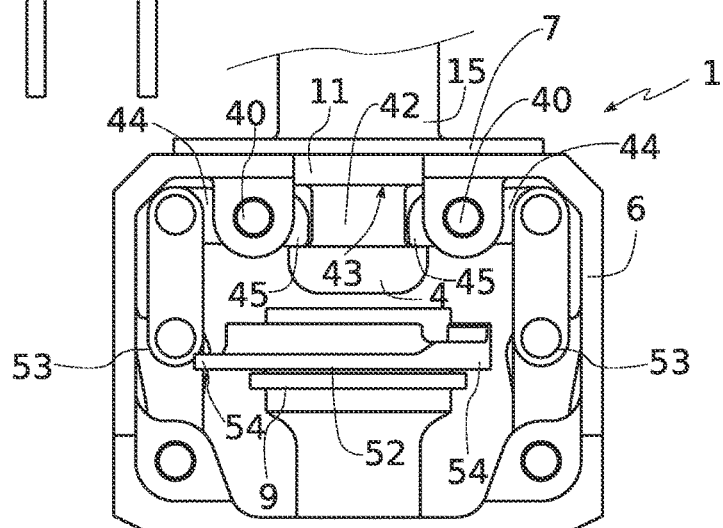
Figure 11:
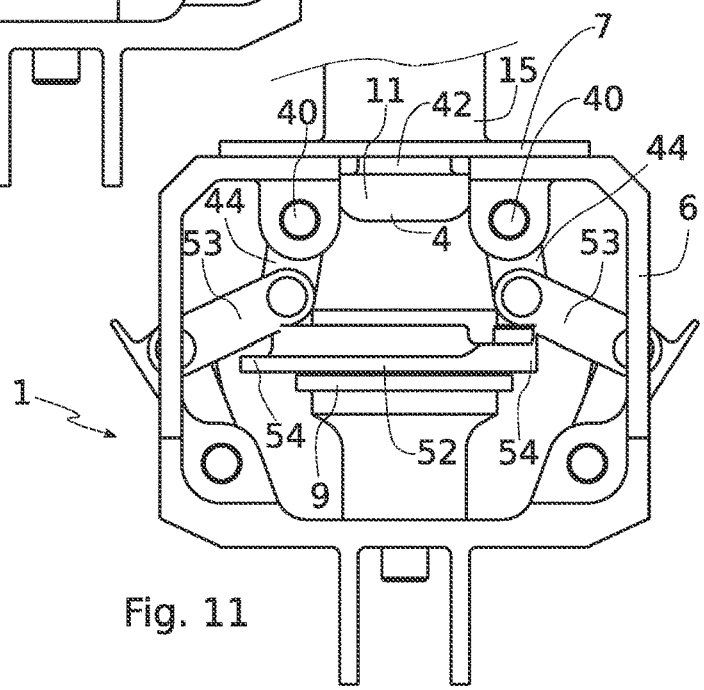

FIGS. 9 to 11 also illustrate a second embodiment of the device 1 of the first embodiment relating to FIGS. 1 to 8. In this second embodiment, the emergency operating device works in the same way as in the first embodiment, and components that are common to both embodiments are numbered in the same way, except for the specific retainer described hereinafter. The other elements of the second embodiment, which therefore work in the same way as in the first embodiment, will not be described again. FIGS. 9 to 11 are cross sections similar to the cross sections of FIGS. 3 and 4.

According to this second embodiment, the retainer 60 comprises a cam 52, two locking levers 44, and a toggle joint device 53 for each lever 44. The cam 52 is mounted with the ability to rotate on the fixed end-stop element 6 and has two diametrically opposed convex portions 54 for actuating each of the toggle joint devices 53. The cam 52 is made to rotate by a control lever identical to the control lever 31 of the first embodiment.

The toggle-joint devices 53 are made up in the conventional way of two articulated rods and are able to move between a closed position (FIG. 9) and an open position (FIG. 11). The toggle-joint devices 53 are each arranged between the fixed end-stop element 6 and one of the levers 44 so that: when the toggle-joint device is in the closed position, the corresponding lever 44 is kept stably in its locked position (the locking tooth 45 restraining the stop surface 43 of the groove 42, see FIG. 9); and when the toggle-joint device is in the open position, the locking tooth 45 of the corresponding lever 44 is moved away from the stop surface, the second end 4 of the operating member 2 no longer being restrained (see FIG. 9).

Starting from the position of FIG. 9, in order to trigger emergency opening, the cam 52 is made to rotate so that the convex portions 54 each push on a toggle-joint device 53. FIG. 10 depicts the toggle-joint devices 53 moving through their point of equilibrium. After having moved beyond the point of equilibrium, still under the thrust of the convex portions 54, the toggle-joint devices 53 flip into their open position (see FIG. 11) and the emergency opening device is thus triggered.

Embodiment variants may be envisioned without departing from the scope of the invention. For example, the number of blades 27 and of levers 44 may vary, at least one lever 44 being needed to collaborate with the groove 42.

Activation of the emergency opening device 1 can be achieved by means other than a control lever 31, for example by a rack used to rotate the rotary latch 9.

The invention claimed is:

1. An emergency opening device for an aircraft door fitted with an opening mechanism, the device comprising:
an actuating device (2, 5) to actuate the opening mechanism, the actuating device (2,5) switches between a passive state and an active state of activating the opening mechanism, and the actuating device comprises: a tubular operating member (2) provided with a first end (3) to connect to the aircraft door, and with a locking second end (4); an elastic compression device (5) arranged between a fixed end-stop element (6) and the tubular operating member (2); a retainer for restraining the locking second end (4), to move between a closed position of locking of the locking second end (4), in a position of the tubular operating member (2) corresponding to the passive state of the actuating device in the passive state, the elastic device (5) is kept compressed, and an open position of releasing of the locking second end (4) allowing the tubular operating member (2) to move along an axis of movement (X) toward a position corresponding to the active state of the actuating device, under the effect of a force resulting from the expansion of the elastic device (5); activating device (31) for activating the actuating device (2, 5) designed to open the retainer;
the tubular operating member (2) has a stop surface (43) on a locking second end (4);
the retainer comprises: a lever (44) equipped with a locking tooth (45), the lever 9440 pivots on the fixed end-stop element (6), the lever (44) being able to move between a closed position having the locking tooth (45) collaborating with the stop surface (43) to lock the locking second end (4), and an open position having the locking tooth (45) distant from the stop surface (43); and a rotary latch (9) having a retaining surface (47) defined by a portion of a cylinder centered on the axis of movement (X), the rotary latch (9) to rotate about the axis of movement (X) between a closed position with the retaining surface (47) holds the lever (44) in a closed position, and an open position having the retaining surface (47) away from the lever (44).

2. The device as claimed in claim 1, wherein the stop surface (43) is defined by a groove (42) made in the locking second end (4) of the tubular operating member (2).

3. The device as claimed in claim 1, wherein the device for activating the actuating device (2, 5) comprise a control lever (31) designed to force the rotary latch (9) to rotate.

4. The device as claimed in claim 1, wherein the rotary latch (9) rotates with respect to the fixed end-stop element (6).

5. The device as claimed in claim 1, further comprising an axis cylinder (15) fixed to the fixed end-stop element (6), the tubular operating member (2) slides in the axis cylinder (15) along the axis of movement (X).

6. The device as claimed in claim 5, wherein the fixed end-stop element (6) comprises:
a body (55) equipped with a fixing device (18), wherein the lever (44) is pivot-mounted on the body (55);
a flange (7) attached to the axis cylinder (15), the elastic device (5) bearing against the flange (7).

7. The device as claimed in claim 5, wherein the tubular operating member (2) is mounted as a sliding fit in the axis cylinder (15).

8. The device as claimed in claim 1, wherein the stop surface (43) is orthogonal to the axis of movement (X).

9. The device as claimed in claim 1, wherein the rotary latch (9) comprises a blade (27) extending axially, the retaining surface (47) being defined by the blade (27).

10. The device as claimed in claim 9, wherein the rotary latch (9) comprises two blades (27) extending axially facing one another, a retaining surface (47) being defined by each blade (27), and in that the retainer comprises two levers (44) each equipped with a locking tooth (45) and each pivot-mounted on the fixed end-stop element (6), each lever (44) being able to move between a closed position having the locking tooth (45) collaborate with the stop surface (43) to lock the locking second end (4), and an open position having the locking tooth (45) away from the stop surface (43), the rotary latch (9) being able to rotate about the axis of movement (X) between a closed position having each retaining surface (47) holds one of the levers (44) in the closed position, and an open position having each retaining surface (47) away from the corresponding lever (44).

11. The device as claimed in claim 9, wherein the blade (27) comprises an end stop (48) for the lever (44).

12. The device as claimed in claim 9, wherein the rotary latch (9) surrounds the axis cylinder (15) and the rotary latch (9) rotates on the axis cylinder (15).

13. The device as claimed in claim 12, wherein the rotary latch (9) is axially fixed to the axis cylinder (15) being held between two axial end stops (39, 46).

14. The device as claimed in claim 1, wherein the lever (44) comprises a rolling ring (25) designed to roll over the retaining surface (47).

15. The device as claimed in claim 1, wherein the fixed end-stop element (6) comprises a window (56) that allows the lever (44) to pass when the lever (44) is in the open position.

16. The device as claimed in claim 15, wherein the window (56) comprises an end stop (57) for the lever (44).

17. The device as claimed in claim 1, wherein the retainer comprises a toggle-joint device (53) operating the lever (44) between the open and the closed positions, and in that the rotary latch (9) comprises a cam, the cam rotate on the fixed end-stop element and collaborates with the toggle-joint device so that rotation of the rotary latch (9) opens the toggle joint device (53).

18. The device as claimed in claim 1, wherein the elastic compression device comprises a tubular spring (5) partially surrounding the tubular operating member (2) and the elastic compression device includes ends placed between the fixed end-stop element (6) and the tubular operating member (2).

* * * * *